(12) United States Patent
Tsubokura et al.

(10) Patent No.: US 7,714,955 B2
(45) Date of Patent: May 11, 2010

(54) LIQUID CRYSTAL DISPLAY DEVICE

(75) Inventors: Masaki Tsubokura, Mobara (JP);
Hiroshi Obata, Chiba (JP); Shunichi Matsumoto, Chiba (JP); Seigo Abo, Hitachi (JP); Yuji Azuma, Fujisawa (JP)

(73) Assignee: IPS Alpha Technology, Ltd., Chiba (JP)

( * ) Notice: Subject to any disclaimer, the term of this patent is extended or adjusted under 35 U.S.C. 154(b) by 0 days.

(21) Appl. No.: 12/457,182

(22) Filed: Jun. 3, 2009

(65) Prior Publication Data
US 2009/0244435 A1 Oct. 1, 2009

Related U.S. Application Data

(63) Continuation of application No. 12/010,689, filed on Jan. 29, 2008, now abandoned.

(30) Foreign Application Priority Data

Jan. 30, 2007 (JP) .............................. 2007-018817

(51) Int. Cl.
*G02F 1/1335* (2006.01)

(52) U.S. Cl. .............................. 349/61; 349/58; 349/60; 362/225; 362/362; 362/97.1; 362/97.2; 439/235; 439/834

(58) Field of Classification Search ............. 349/58–60, 349/64; 362/225, 362, 97.1, 97.2; 439/235, 439/834
See application file for complete search history.

(56) References Cited

U.S. PATENT DOCUMENTS

| 6,905,224 | B2 | 6/2005 | Yoo et al. |
| 7,426,106 | B2 | 9/2008 | Nakagawa et al. |
| 2008/0204627 | A1 | 8/2008 | Tsubokura et al. |

FOREIGN PATENT DOCUMENTS

| KR | 10-2005-0030867 | 9/2004 |
| KR | 10-2006-0134531 | 6/2005 |

*Primary Examiner*—Frank G Font
*Assistant Examiner*—Michael P Mooney
(74) *Attorney, Agent, or Firm*—Stites & Harbison PLLC; Juan Carlos A. Marquez, Esq.

(57) ABSTRACT

The present invention provides a liquid crystal display device which reduces the occurrence of a squeal. A liquid crystal display device includes a liquid crystal display panel and a backlight arranged on a back surface of the liquid crystal display panel, wherein the backlight includes a base, a plurality of rod-shaped light sources arranged between the liquid crystal display panel and the base, electrode fittings for supporting electrode portions of the respective rod-shaped light sources, connection portions allowing the plurality of electrode fittings to be connected thereto and extending in the direction orthogonal to the longitudinal direction of the rod-shaped light sources, pushing members for pushing the connection portions toward a base side, and friction sound reducing members arranged between the connection portions and the pushing members and/or between the connection portions and the base side.

16 Claims, 7 Drawing Sheets

LIQUID CRYSTAL DISPLAY DEVICE

CROSS-REFERENCES TO RELATED APPLICATIONS

This application is a Continuation Application from U.S. application Ser. No. 12/010,689 filed Jan. 29, 2008 now abandoned. Priority is claimed from U.S. application Ser. No. 12/010,689 filed Jan. 29, 2008 which claims priority to Japanese Patent Application No. 2007-018817, filed on Jan. 30, 2007, all of which is incorporated herein by reference.

BACKGROUND OF THE INVENTION

1. Field of the Invention

The present invention relates to a liquid crystal display device, and more particularly to a liquid crystal display device having a so-called direct-type backlight.

2. Description of the Related Art

With respect to a liquid crystal display device, along with a demand for large-sizing of a liquid crystal display panel, as a backlight, a direct-type backlight which can make a planar light source uniform has been used.

In such a backlight, in a plane of the base having a light reflection function which faces the liquid crystal display panel in an opposed manner, a plurality of fluorescent lamps is arranged in the direction orthogonal to the longitudinal direction of the fluorescent lamps. These respective fluorescent lamps have electrode portions formed on both ends thereof clamped by electrode fittings, and the electrode fittings are arranged at both ends of the base.

Further, a plurality of electrode fittings is formed on an electrode support member made of a strip-shaped conductive material extending in the parallel-arranged direction of the fluorescent lamps. That is, the electrode support member has a function of clamping a plurality of fluorescent lamps.

Accordingly, the plurality of fluorescent lamps in the inside of the backlight is configured to be connected in parallel by means of the electrode support members and the electrode fittings arranged at both ends of the base.

The liquid crystal display device having such a backlight is, for example, disclosed in the following patent document 1. JP-A-2005-347259 corresponding to US2005/0265047A1 relevant to JP-A-2005-347259

SUMMARY OF THE INVENTION

However, in the liquid crystal display device having such a constitution, the electrode support member is made of a relatively elongated strip-shape material and hence, an expansion ratio due to heat from the fluorescent lamps becomes large whereby when the electrode support member is firmly fixed to the base side by a chance, the electrode support member is liable to be easily deflected between these fixed portions.

Accordingly, an attempt has been made to provide the electrode support member constituted such that the electrode support member is relatively loosely fixed to the base to allow the extension of the electrode support member even when the thermal expansion is generated, and the electrode support member is pushed to the base side using other member formed separately from the base.

However, when the electrode support member is constituted in such a manner, a contact between the electrode support member and the above-mentioned other member cannot be avoided and hence, when the electrode support member is extended due to the thermal expansion, there arises a drawback that a squeal occurs between the electrode support member and other member.

Accordingly, it is an object of the present invention to provide a liquid crystal display device which can reduce the occurrence of such a squeal.

To briefly explain the summary of typical inventions among the inventions disclosed in this specification, they are as follows.

According to one aspect of the present invention, there is provided a liquid crystal display device including, for example, a liquid crystal display panel and a backlight arranged on a back surface of the liquid crystal display panel, wherein the backlight includes a base, a plurality of rod-shaped light sources arranged between the liquid crystal display panel and the base, electrode fittings for supporting electrode portions of the respective rod-shaped light sources, connection portions allowing the plurality of electrode fittings to be connected thereto and extending in the direction orthogonal to the longitudinal direction of the rod-shaped light sources, pushing members for pushing the connection portions toward a base side, and friction sound reducing members arranged between the connection portions and the pushing members and/or between the connection portions and the base side.

According to another aspect of the present invention, there is provided a liquid crystal panel module including a liquid crystal display panel and a backlight arranged on a back surface of the liquid crystal display panel, wherein the backlight includes a base having a rectangular shape, a plurality of rod-shaped light sources arranged between the liquid crystal display panel and the base, electrode fittings for supporting electrode portions of the respective rod-shaped light sources, connection portions allowing the plurality of electrode fittings to be connected thereto and extending along short sides of the base, pushing members for pushing the connection portions toward a base side, and friction sound reducing members arranged between the connection portions and the pushing members and/or between the connection portions and the base side.

Here, the present invention is not limited to the above-mentioned constitution, and various modifications can be made without departing from the technical concept of the present invention.

According to the liquid crystal display device having such a constitution, it is possible to reduce the occurrence of a squeal.

BRIEF DESCRIPTION OF THE DRAWINGS

FIG. 4A and FIG. 4B are constitutional views showing one embodiment of a backlight provided to the liquid crystal display device according to the present invention, wherein

FIG. 6A and FIG. 6B are views showing the electrode support members and the electrode fittings, wherein

DESCRIPTION OF THE PREFERRED EMBODIMENT

Hereinafter, an embodiment of a liquid crystal display device according to the present invention is explained in conjunction with drawings.

Figure 2:
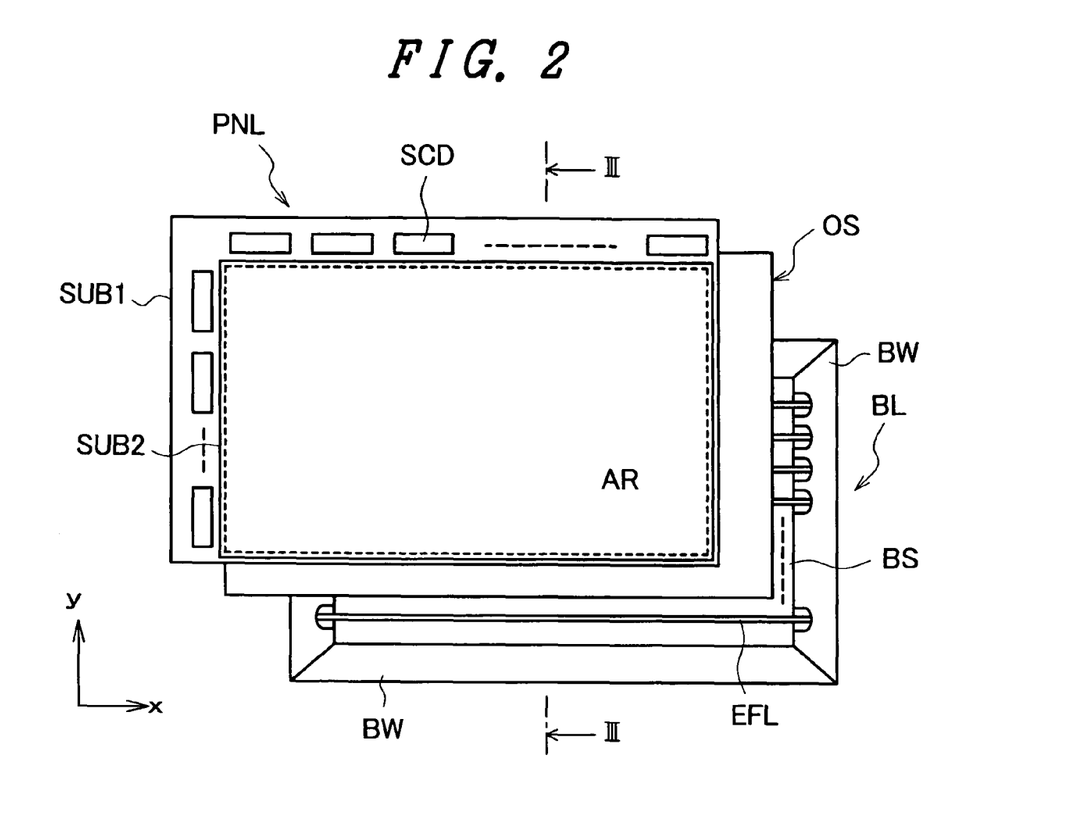
FIG. 2 is a schematic constitutional view showing one embodiment of the liquid crystal display device according to the present invention.

FIG. 2 is a schematic constitutional view showing one embodiment of the liquid crystal display device according to the present invention.

First of all, as viewed from a viewer's side, a liquid crystal display panel PNL, an optical sheet OS and a backlight BL are sequentially arranged.

The liquid crystal display panel PNL is configured such that a pair of substrates SUB1, SUB2 which is arranged in parallel and is made of glass, for example, forms an envelope, and liquid crystal is interposed between the respective substrates SUB1, SUB2.

On a liquid-crystal-side surface of the substrate SUB1 or SUB2, pixels arranged in a matrix array (not shown in the drawing) are formed in a state that liquid crystal forms one constitutional element of the pixel, and each pixel can control light transmissivity of the liquid crystal.

Further, a region on which the respective pixels are formed is referred to as a liquid crystal display region AR (a region surrounded by a chained line frame in the drawing), light from a backlight BL described later is radiated to a whole area of the liquid crystal display region AR, and a viewer is allowed to recognize an image using light which passes through the respective pixels.

Here, the substrate SUB1 arranged at a rear side from a viewer's side has an area larger than an area of the substrate SUB2, and a semiconductor device SCD formed of a circuit for independently driving the respective pixels is mounted on a periphery of the substrate SUB1 exposed from the substrate SUB2.

Here, the semiconductor device SCD may be mounted not only on the substrate SUB1 but also on a flexible printed circuit board connected to the substrate SUB2.

On a back surface of the liquid crystal display panel PNL, for example, a backlight BL is arranged by way of an optical sheet OS such as a diffusion sheet, a prism sheet or a stacked body of these sheets. The optical sheet OS is provided for guiding light from the backlight BL to a liquid-crystal-display-panel-PNL side by diffusing or condensing light.

The backlight BL is a co-called direct-type backlight, and is constituted of a liquid crystal display panel PNL, a plurality of, for example, external electrode fluorescent lamps EFL arranged in parallel to each other in a plane parallel to the liquid crystal display panel PNL, and a base BS supporting these external electrode fluorescent lamps EFL and, at the same time, having a reflection surface for guiding light from the external electrode fluorescent lamps EFL to a liquid-crystal-display-panel-PNL side. The base BS includes side wall plates BW and side wall plates BWh on four side portions thereof, and constitutes a box together with the side wall plates BW and the side wall plates BWh. The respective external electrode fluorescent lamps EFL, for example, have the longitudinal direction thereof directed in the x direction in the drawing, and are arranged in parallel to each other in the y direction in the drawing. The constitution of the backlight BL is explained in detail later.

Figure 3:
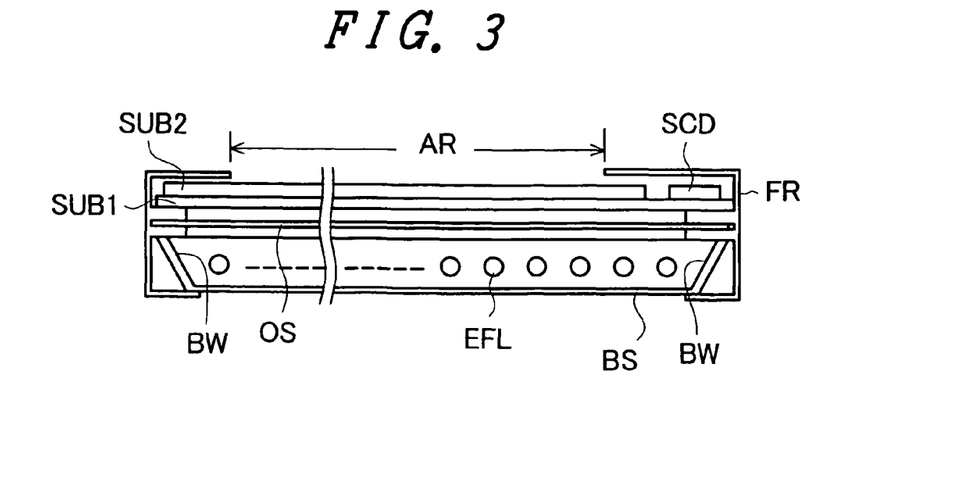
FIG. 3 is a cross-sectional view of a liquid crystal display device formed into a module.

Further, the liquid crystal display panel PNL, the optical sheet OS and the backlight BL are accommodated in the inside of a frame FR and constitute a liquid crystal display device formed into a module. FIG. 3 is a cross-sectional view of the liquid crystal display device formed into a module and shows a cross section of a portion corresponding to a line III-III in FIG. 2. In the frame FR, on a viewer's side, an opening OP which exposes the liquid crystal display region AR of the liquid crystal display panel PNL is formed. In the frame FR, the liquid crystal display panel PNL, the optical sheet OS and the backlight BL are positioned and stored with sufficient accuracy.

Figure 4A:
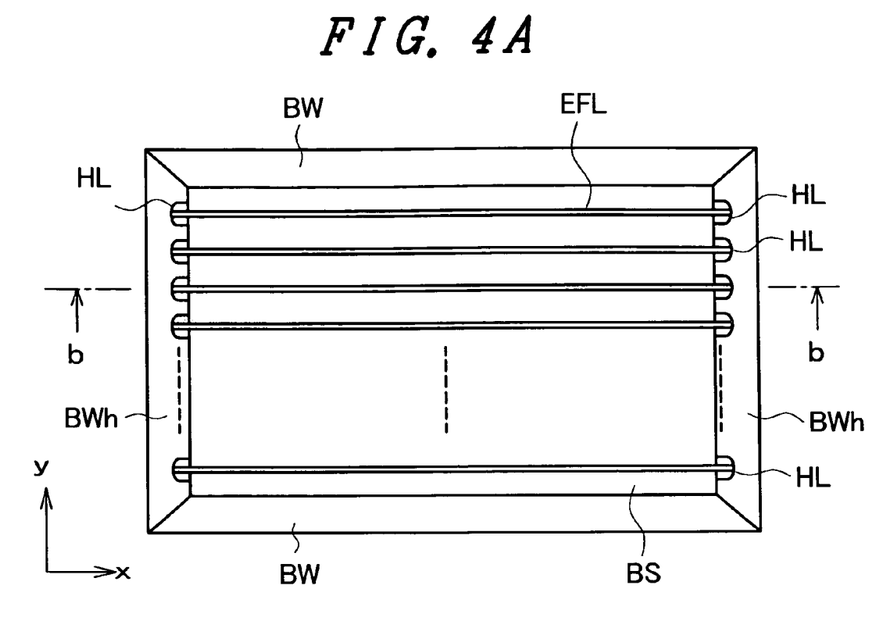
FIG. 4A is a plan view of the backlight.
Figure 4B:
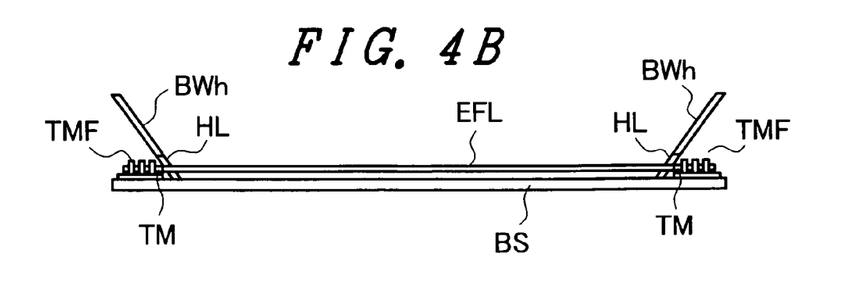
FIG. 4B is a cross-sectional view taken along a line b-b in FIG. 4A.

FIG. 4A is a plan view showing only the backlight BL, and FIG. 4B is a cross-sectional view taken along a line b-b in FIG. 4A.

In FIG. 4A, the side wall plates BW and the side wall plates BWh are arranged with inclination spreading at an obtuse angle with respect to a surface of a bottom plate BB.

Further, with respect to the base BS and the respective side wall plates BW, BWh, surfaces of these parts on a liquid-crystal-display-panel-PNL-side are treated to possess a light reflecting function. Accordingly, out of light emitted from the external electrode fluorescent lamps EFL, light radiated in the directions other than the direction toward the liquid crystal display panel PNL is reflected on the base BS and the side wall plates BW, BWh and is directed toward the liquid crystal display panel PNL.

Each external electrode fluorescent lamp EFL has an electrode TM at respective ends thereof, and these electrodes TM are positioned below the side wall plates BWh through respective holes HL formed in the side wall plates BWh arranged to face each other in an opposed manner in the x direction in the drawing.

The respective electrodes TM of each external electrode fluorescent lamp EFL are clamped by (engaged with) electrode fittings TMF mounted on the base BS below the side wall plate BWh. Due to such a constitution, each external electrode fluorescent lamp EFL is supported on the base BS by the electrode fittings TMF and, at the same time, a power source is supplied to the external electrode fluorescent lamp EFL through the electrode fittings TMF.

Figure 5:
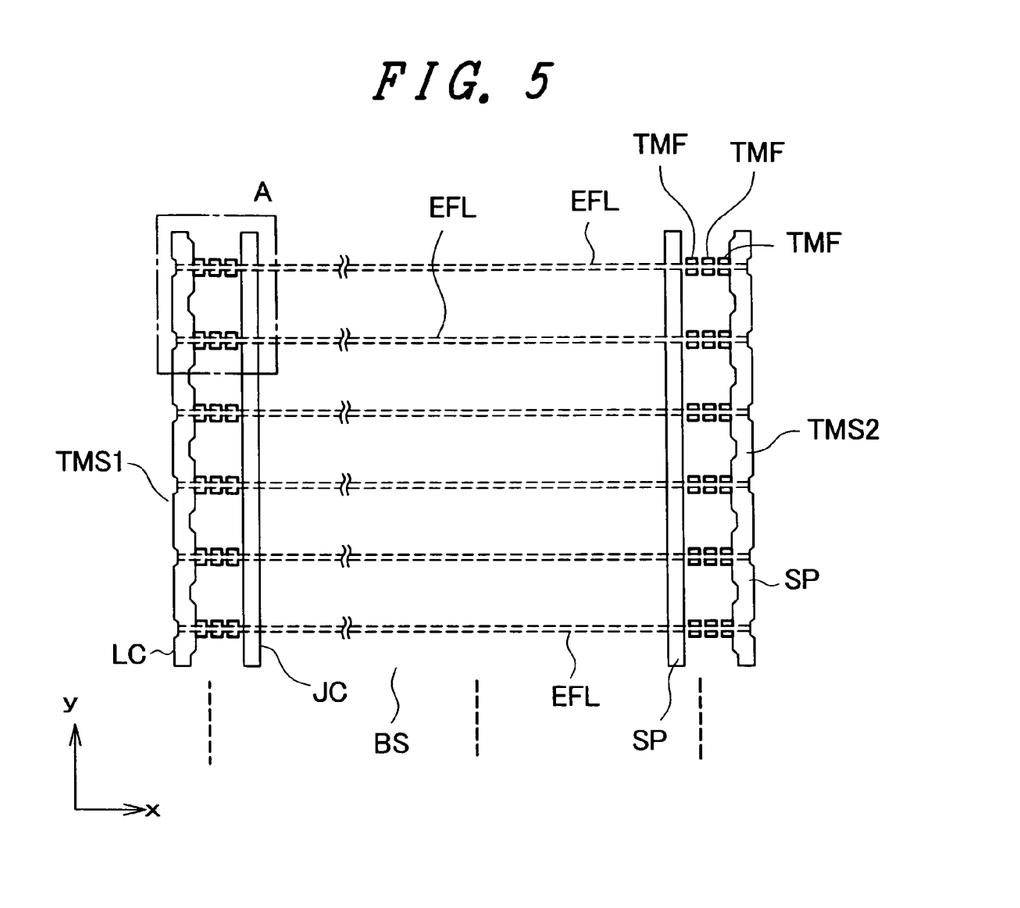
FIG. 5 is a plan view showing one embodiment of the electrode support members provided with the electrode fittings for supporting the electrode portions of the external electrode fluorescent lamps in the liquid crystal display device according to the present invention.

The electrode fittings TMF are formed on electrode support members TMS1, TMS2 respectively arranged on both end sides of the respective external electrode fluorescent lamps EFL. FIG. 5 is a plan view showing the above-mentioned electrode support members TMS1, TMS2.

In FIG. 5, one electrode support member TMS1 is arranged on a left side (in the drawing) of a region where the external electrode fluorescent lamps EFL are arranged (indicated by a dotted line in the drawing), and another electrode support member TMS2 is arranged on a right side (in the drawing) of the region. These electrode support members TMS1, TMS2 are respectively configured to extend in the y direction.

That is, the electrode support member TMS1 supports portions of the electrodes TM at left ends (in the drawing) of the respective external electrode fluorescent lamps EFL in common, while another electrode support member TMS2 supports portions of the electrodes TM at right ends (in the drawing) of the respective external electrode fluorescent lamps EFL in common.

The electrode support members TMS1, TMS2 are respectively configured such that between a pair of connection portions JC which extends in parallel to each other, an electrode-fitting group formed of a plurality of electrode fittings TMF arranged in parallel to each other in the direction intersecting these connection portions JC is arranged and supported in parallel to the extending direction of the connection portions JC. Further, the electrode support members TMS1, TMS2 are entirely formed of a conductive material.

Further, the electrode support member TMS1 is configured such that each electrode fitting TMF is arranged in a three-split manner along the longitudinal direction of the electrode TM of the external electrode fluorescent lamp EFL on a left side in the drawing, and the respective split electrode fittings TMF clamp the electrode TM thus supporting the left side of each external electrode fluorescent lamp EFL. In the same manner, the electrode support member TMS2 is configured such that each electrode fitting TMF is arranged in a three-split manner along the longitudinal direction of the electrode TM of the external electrode fluorescent lamp EFL on a right side in the drawing, and the respective split electrode fittings TMF clamp the electrode TM thus supporting the right side of each external electrode fluorescent lamp EFL. The reason that the electrode fitting TMF is split in three is that when at least one electrode fitting TMF exhibits an insufficient electrical contact, a sufficient electrical contact can be ensured by other remaining electrode fittings TMF.

Further, these electrode support members TMS1, TMS2 are formed by press-forming a sheet material, for example.

Figures 6A, 6B:
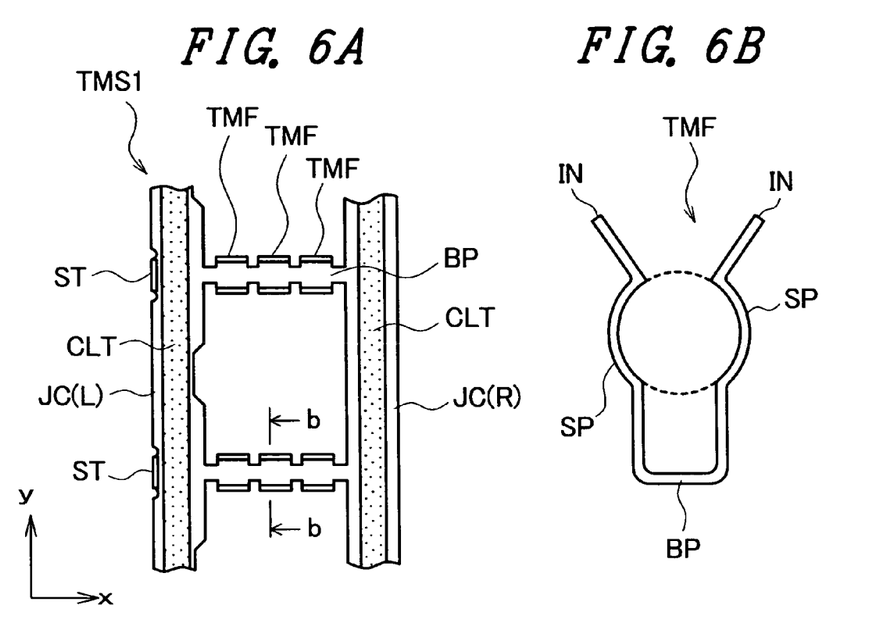
FIG. 6A is an enlarged view of the electrode support members.
FIG. 6B is a cross-sectional view taken along a line b-b in FIG. 6A showing a cross section of the electrode fitting.

FIG. 6A is an enlarged view depicted by extracting a portion of a dotted frame A shown in FIG. 5. In FIG. 6A, the electrode support member TMS1 includes a base portion BP which fixes three electrode fittings TMF arranged in parallel to each other thereto in common and a left-side connection portion JC(L) and a right-side connection portion JC(R) connected to both ends of the base portion BP. As viewed in a plan view, the plurality of base portions BP and the respective connection portions JC(L), JC(R) form a ladder-shaped pattern. On respective connection portions JC(L), JC(R), anon-woven fabric CLT described later is mounted. In FIG. 5, the non-woven fabric CLT is not shown.

Further, FIG. 6B is a cross-sectional view taken along a line b-b in FIG. 6A showing the electrode fitting TMF.

The electrode fitting TMF is formed into the bifurcated structure which includes a pair of opposedly facing tongues for clamping the external electrode fluorescent lamp EFL from both sides. That is, the electrode fitting TMF includes a pair of support portions SP bent in the vertical direction, for example, from both sides of the base portion BP of the electrode support member TMS1, and these respective support portions SP have an arcuate portion which pushes a peripheral surface of the external electrode fluorescent lamp EFL.

Further, the electrode fitting TMF includes introduction portions IN. These introduction portions IN facilitate the introduction of the external electrode fluorescent lamp EFL into the electrode fitting TMF.

A circle indicated by a dotted line in FIG. 6B indicates the peripheral surface of the external electrode fluorescent lamp EFL.

Returning to FIG. 6A, on the left-side connection portion JC(L) of the electrode support member TMS1, projection portions ST are mounted in an erected manner at portions where the left-side connection portion JC(L) intersects the base portions BP in the extending direction (x direction in the drawing) of the base portions BP. The projection portions ST are provided for restricting the movement of the external electrode fluorescent lamps EFL in the longitudinal direction (x direction).

The electrode support member TMS2 which forms the pair with the electrode support member TMS1 has the substantially equal constitution although the left-and-right relationship in the drawing becomes opposite.

Here, the electrode support members TMS1, TMS2 are pushed toward the base BS side by ribs RB described later which are formed on back surfaces of the side wall plates BWh in the extending direction of the connection portions JC. Due to such a constitution, fixing of the electrode support members TMS1, TMS2 to the base BS is guaranteed.

Figure 7:
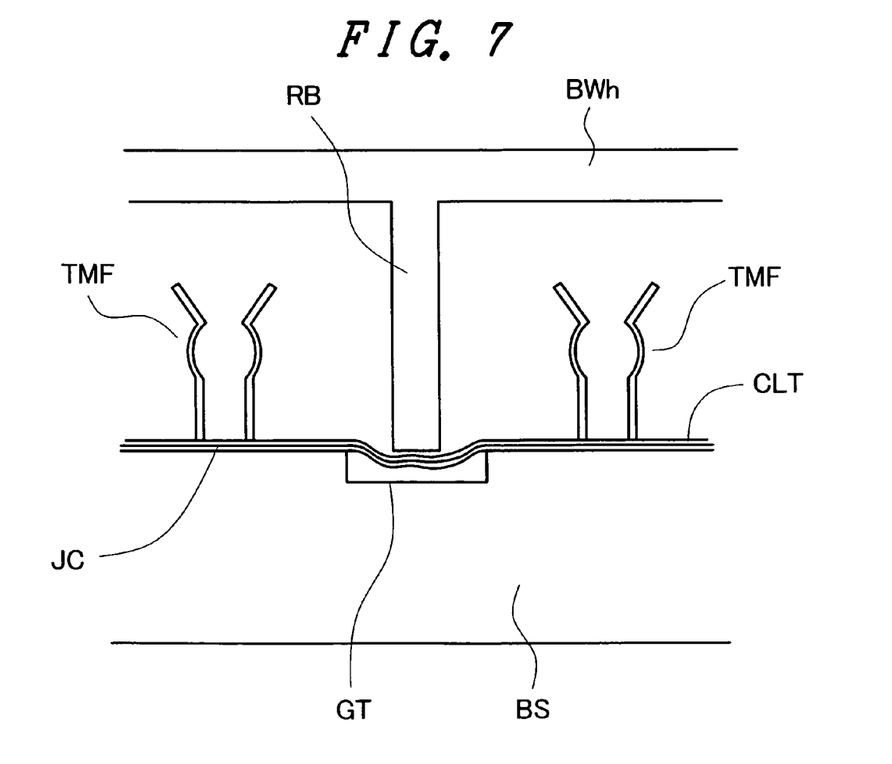
FIG. 7 is an explanatory view showing a state in which the electrode support member is pushed by a rib of a side wall plate toward a base side by way of the non-woven fabric.

FIG. 7 is a view showing the electrode fitting TMF as viewed in the tube-axis direction of the external electrode fluorescent lamp EFL. FIG. 7 shows a state in which the electrode support member TMS (particularly, a portion of the connection portion JC) is pushed to the base BS side by the rib RB integrally formed with the back surface side (a surface side opposite to the liquid crystal display panel PNL) of the side wall plate BWh. That is, the rib RB is configured to function as a pushing member for pushing the electrode support member TMS to the base BS side.

In this case, a groove GT is formed in a portion of the base BS which faces the rib RB in an opposed manner. The groove GT is provided for enhancing the reliability of pushing of the electrode support member TMS by the rib RB toward the base BS. However, it is not always necessary to form such a groove GT.

In this embodiment, for preventing the direct contact of the rib RB with the electrode support member TMS (particularly the portion of the connection portion JC), the non-woven fabric CLT is mounted on the connection portion JC of the electrode support member TMS and the rib RB is brought into contact with the non-woven fabric CLT. That is, pushing of the electrode support member TMS toward the base BS by the rib RB is performed by way of the non-woven fabric CLT.

When the electrode support member TMS and the rib RB move from each other due to the thermal expansion of the electrode support member TMS or the like, the rib RB is directly brought into contact with the electrode support member TMS (particularly the portion of the connection portion JC) and hence, a friction sound occurs between the connection portion JC and the rib RB as a squeal. The non-woven fabric CLT performs a function of reducing the friction sound which occurs between the connection portion JC and the rib RB thus obviating the occurrence of the squeal attributed to the thermal expansion of the electrode support member TMS.

Figure 1:
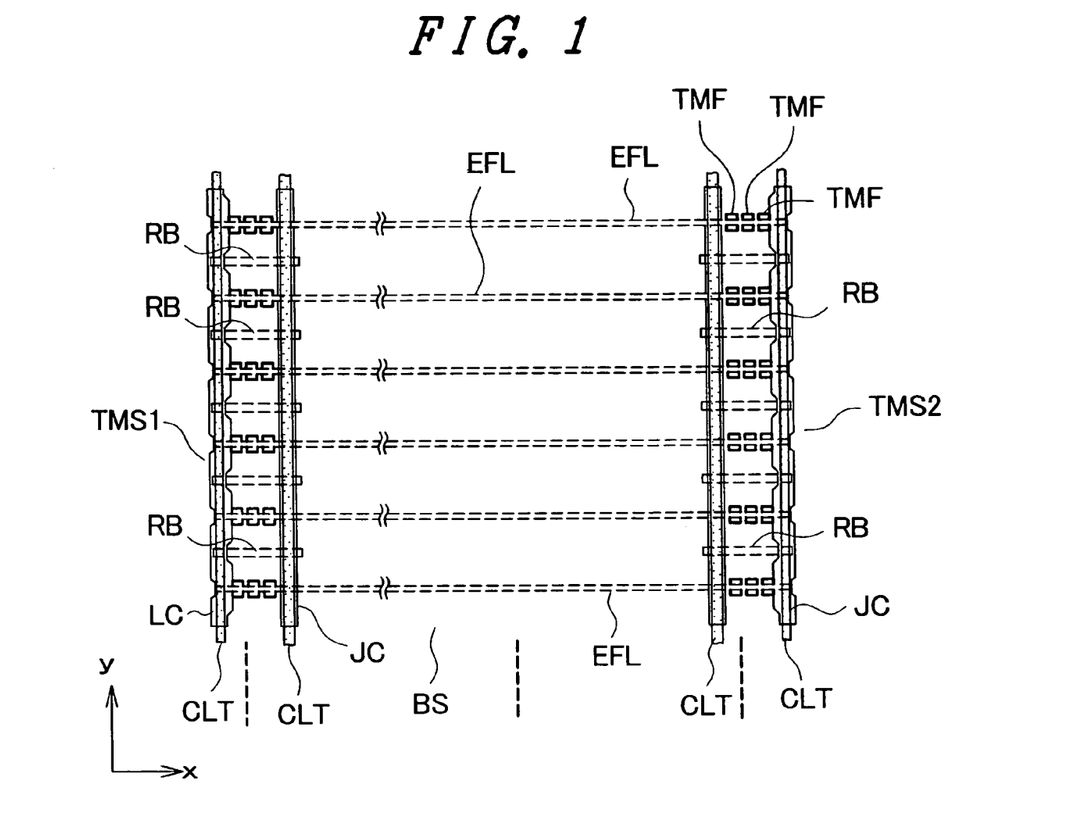
FIG. 1 is a constitutional view of an essential part showing one embodiment of a liquid crystal display device according to the present invention, and also is a view for explaining electrode support members provided with electrode fittings for supporting electrode portions of external electrode fluorescent lamps and non-woven fabrics arranged above connection portions of the electrode support members.

FIG. 5 is a view corresponding to FIG. 1 and shows that the strip-shaped non-woven fabric CLT is placed above the connection portions JC of the respective electrode support members TMS1, TMS2 along the extending direction of the connection portions JC. In FIG. 1, the arrangement positions of the ribs RB integrally formed with the side wall plates BWh (not shown in the drawing) are indicated by a dotted frame.

As described above, the electrode support member TMS (particularly the portion of the connection portion JC) is pushed toward the base BS side by the rib RB by way of the non-woven fabric CLT.

Pushing of the electrode support member TMS (particularly the portion of the connection portion JC) toward the base BS side by the rib RB is performed by fixing (or temporarily fixing) the side wall plates BWh to the base BS as described later.

As shown in FIG. 1, the ribs RB are arranged in parallel to each other in the y direction in the drawing such that the ribs RB are arranged alternately with the electrode fittings TMF of the electrode support member TMS with the electrode fitting TMF sandwiched between the ribs RB.

In the above-mentioned embodiment, for facilitating the understanding of the invention, the explanation is made with respect to the case that the electrode support member TMS is directly mounted on the base BS.

Figure 8A:
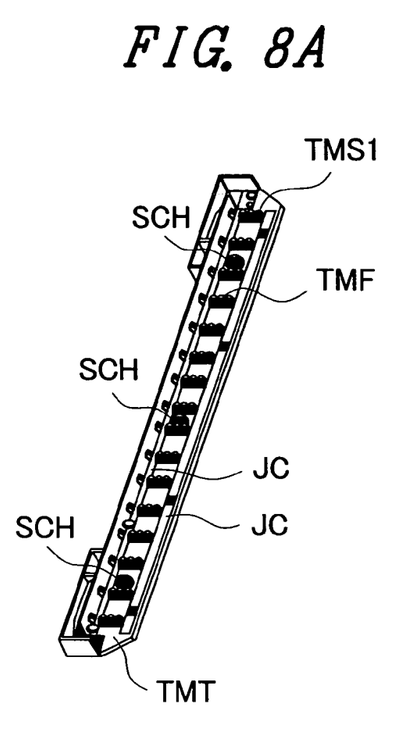
FIG. 8A and FIG. 8B are perspective views showing an electrode support base on which the electrode support member is mounted and the side wall plate on which the ribs are formed respectively.

However, as shown in FIG. 8A, the electrode support member TMS may be configured to be mounted on an electrode support base TMT formed as a member separate from the base BS.

Here, a side wall plate BWh provided with the ribs RB may be fitted into the electrode support base TMT, and the electrode support base TMT and the side wall plates BWh formed into a module by such fitting may by fixed to the base BS using screws, for example.

Figure 8B:
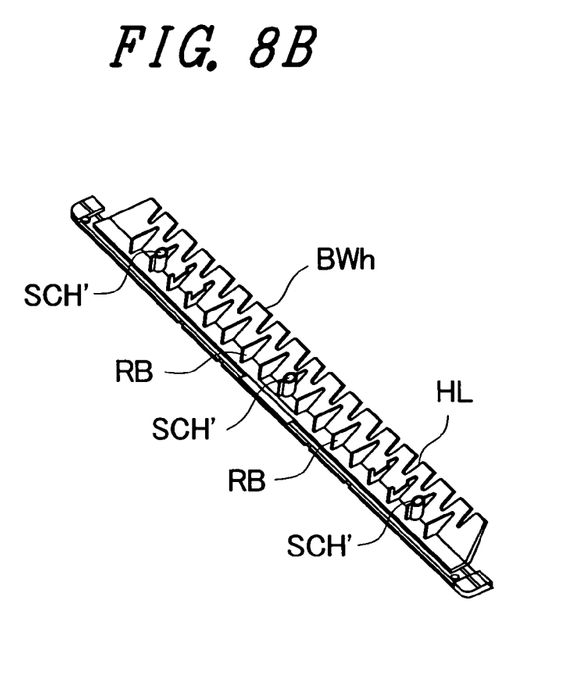

That is, FIG. 8B is a perspective view showing the side wall plate BWh as viewed from a surface side of the side wall plate BWh on which the ribs RB are formed. The side wall plate BWh is fitted into the electrode support base TMT by reversing front and back surfaces of the side wall plate BWh from a state shown in FIG. 8B and by further reversing the side wall plate BWh in a lateral direction, and by applying the side wall plate BWh to the electrode support base TMT shown in FIG. 8A.

Here, in such a fitted state, the electrode support member TMS is pushed toward the electrode support base TMT side by the rib RB of the side wall plates BWh by way of the non-woven fabric CLT.

Further, screw holes SCH arranged in parallel in the longitudinal direction are formed in the electrode support base TMT. Screw holes SCH' corresponding to the screw holes SCH are also formed in the side wall plate BWh. These screw holes SCH, SCH' have center axes thereof aligned with each other when the side wall plate BWh is fitted into the electrode support base TMT. Further, the electrode support base TMT and the side wall plate BWh are fixed to the base BS by screws (not shown in the drawing) threaded into the base BS through the screw holes SCH, SCH' formed in the electrode support base TMT and the side wall plate BWh.

Figure 9:
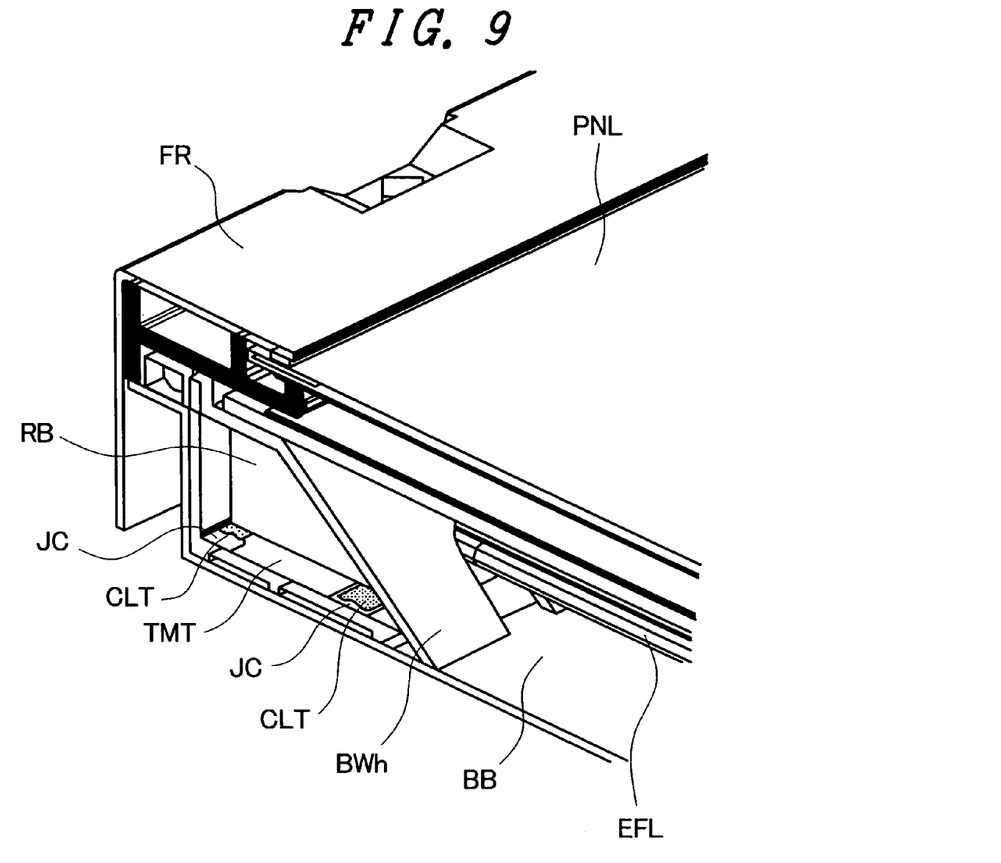
FIG. 9 is a cross-sectional view of the liquid crystal display device formed into the module taken along a vertical plane parallel to the external electrode fluorescent lamps.

FIG. 9 is a cross-sectional view of the liquid crystal display device formed into a module by combining a frame FR and the liquid crystal display panel PNL taken along a vertical plane parallel to the external electrode fluorescent lamps EFL. FIG. 9 shows a state that the ribs RB formed on the side wall plate BWh push the connection portion JC by way of the non-woven fabric CLT.

In the above-mentioned embodiment, the explanation has been made with respect to the constitution which mounts the electrode support member TMS on the electrode support base TMT. As another embodiment, it is needless to say that the electrode support member TMS may be directly mounted on the base BS.

Further, in the above-mentioned embodiment, the non-woven fabric CLT is interposed between the electrode support member TMS and the rib RB of the side wall plate BWh as the friction sound reducing member. However, the non-woven fabric CLT has a function of reducing a squeal which occurs between the electrode support member TMS and the rib RB. Accordingly, it is needless to say that the friction sound reducing member is not limited to the non-woven fabric CLT and a material made of rubber, for example, may be used.

Further, the friction sound reducing member may be any one selected from a group consisting of a fluoro-rubber resin film, a film having a surface to which fluorination is applied, a poly-acetal resin film, a polyethylene film and a silicon coating film.

Figure 10A:
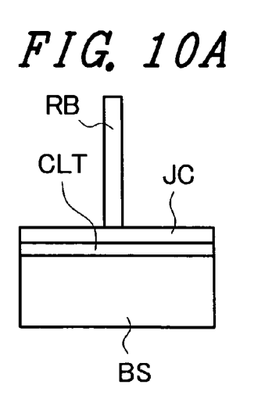
FIG. 10A to FIG. 10C are explanatory views showing another embodiments of the liquid crystal display device according to the present invention.
Figure 10B:
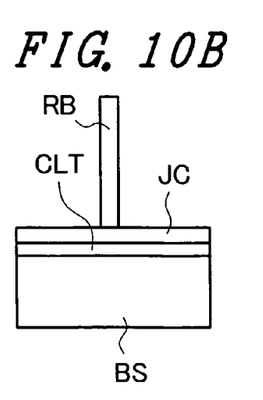
Figure 10C:
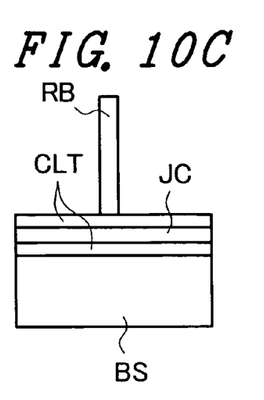

Further, in the above-mentioned embodiment, as shown in FIG. 10A, the non-woven fabric CLT which constitutes the friction sound reducing member is arranged between the connection portion JC of the electrode support member TMS and the rib RB of the side wall plate BW. However, as shown in FIG. 10B, the non-woven fabric CLT may be arranged between the connection portion JC of the electrode support member TMS and the base BS side. This is because such a constitution can reduce the occurrence of a squeal generated between the connection portion JC and the base BS side. Accordingly, as shown in FIG. 10C, the non-woven fabric CLT may be arranged between the connection portion JC and the rib RB as well as between the connection portion JC and the base BS side respectively. Here, the term "base BS side" is used because when the electrode support member TMS is arranged on the electrode support base TMT, the non-woven fabric CLT may be arranged between the connection portion JC of the electrode support member TMS and the electrode support base TMT.

Further, in the above-mentioned embodiment, as the pushing member for pushing the electrode support member TMS, the ribs RB formed on the side wall plate BWh are used. However, the pushing member is not always limited to the side wall plate BWh and may be formed of other member fixed to the base BS.

Further, in the above-mentioned embodiments, the external electrode fluorescent lamps EFL are used as a light source of the backlight BL. However, the light source is not limited to the external electrode fluorescent lamps and may be constituted of rod-shaped light sources which are similar to the external electrode fluorescent lamps in shape.

The above-mentioned respective embodiments may be adopted in a single form or in combination. This is because the advantageous effect of the respective embodiments can be acquired independently or synergistically.

What is claimed is:

1. A liquid crystal display device comprising:
a liquid crystal display panel; and
a backlight arranged on a back surface of the liquid crystal display panel, wherein
the backlight includes
a base,
a plurality of rod-shaped light sources arranged between the liquid crystal display panel and the base,
electrode fittings for supporting electrode portions of the respective rod-shaped light sources,
connection, portions allowing the plurality of electrode fittings to be connected thereto and extending in the direction orthogonal to the longitudinal direction of the rod-shaped light sources,
pushing members for pushing the connection portions toward a base side, and
friction sound reducing members arranged between the connection portions and the pushing members and/or between the connection portions and the base side wherein the pushing members are formed on side wall plates which cover the electrode portions from above, wherein the side wall plates are arranged with inclination spreading at an obtuse angle with respect to a surface of the base, and a light reflecting function is imparted to liquid-crystal-display-panel-side surfaces of the side wall plates.

2. A liquid crystal display device according to claim 1, wherein the friction sound reducing member is formed of a strip shaped member arranged along the extending direction of the connection portion.

3. A liquid crystal display device according to claim 1, wherein the friction sound reducing member is made of non-woven fabric or rubber.

4. A liquid crystal display device according to claim 1, wherein electrode support bases on which the connection portion and the electrode fittings are mounted are arranged between the base and the connection portions.

5. A liquid crystal display device according to claim 4, wherein the electrode support bases and the side wall plates are fixed to the base using screws.

6. A liquid crystal display device according to claim 1, wherein grooves are formed at positions of the base side which face the pushing members.

7. A liquid crystal display device according to claim 1, wherein the electrode fittings are formed between the pair of connection portions which extends in parallel to each other, and are divided in plural numbers.

8. A liquid crystal display device according to claim 1, wherein the electrode fittings and the connection portions are formed of a conductive member.

9. A liquid crystal panel module comprising:

a liquid crystal display panel; and a backlight arranged on a back surface of the liquid crystal display panel, wherein the backlight includes a base having a rectangular shape, a plurality of rod-shaped light sources arranged between the liquid crystal display panel and the base, electrode fittings for supporting electrode portions of the respective rod-shaped light sources, connection portions allowing the plurality of electrode fittings to be connected thereto and extending along short sides of the base, pushing members for pushing the connection portions toward a base side, and friction sound reducing members arranged between the connection portions and the pushing members and/or between the connection portions and the base side, wherein the pushing members are formed on side wall plates which cover the electrode portions from above, wherein the side wall plates are arranged with inclination spreading at an obtuse angle with respect to a surface of the base, and a light reflecting function is imparted to liquid-crystal-display-panel-side surfaces of the side wall plates.

10. A liquid crystal panel module according to claim 9, wherein the friction sound reducing member is formed of a strip shaped member arranged along the extending direction of the connection portion.

11. A liquid crystal panel module according to claim 9, wherein the friction sound reducing member is made of non-woven fabric or rubber.

12. A liquid crystal panel module according to claim 9, wherein electrode support bases on which the connection portion and the electrode fittings are mounted are arranged between the base and the connection portions.

13. A liquid crystal panel module according to claim 12, wherein the electrode support bases and the side wall plates are fixed to the base using screws.

14. A liquid crystal panel module according to claim 9, wherein grooves are formed at positions of the base side which face the pushing members.

15. A liquid crystal panel module according to claim 9, wherein the electrode fittings are formed between the pair of connection portions which extends in parallel to each other, and are divided in plural numbers.

16. A liquid crystal panel module according to claim 9, wherein the electrode fittings and the connection portions are formed of a conductive member.

* * * * *